US012207603B2

(12) United States Patent
Tompkin et al.

(10) Patent No.: US 12,207,603 B2
(45) Date of Patent: *Jan. 28, 2025

(54) LIGHTING SYSTEM FOR VERTICAL GARDEN

(71) Applicant: Lettuce Grow by TFP, LLC, Marina Del Rey, CA (US)

(72) Inventors: Pip Tompkin, Irvine, CA (US); Jacob Pechenik, Venice, CA (US); Peter Kaltenbach, Austin, TX (US)

(73) Assignee: Lettuce Grow by TFP, LLC, Marina Del Rey, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/935,250

(22) Filed: Sep. 26, 2022

(65) Prior Publication Data

US 2023/0011473 A1 Jan. 12, 2023

Related U.S. Application Data

(63) Continuation of application No. 17/112,992, filed on Dec. 5, 2020, now Pat. No. 11,452,265.

(51) Int. Cl.
| | |
|---|---|
| *A01G 7/04* | (2006.01) |
| *A01G 9/02* | (2018.01) |
| *A01G 9/24* | (2006.01) |
| *F21V 23/00* | (2015.01) |
| *F21V 23/06* | (2006.01) |
| *A01G 31/06* | (2006.01) |

(Continued)

(52) U.S. Cl.
CPC ............. *A01G 7/045* (2013.01); *A01G 9/023* (2013.01); *A01G 9/249* (2019.05); *F21V 23/003* (2013.01); *F21V 23/06* (2013.01); *A01G 31/06* (2013.01); *F21Y 2105/18* (2016.08); *F21Y 2107/50* (2016.08)

(58) Field of Classification Search
CPC ...... A01G 7/045; A01G 9/249; F21V 23/003; F21V 223/06; F21Y 2105/18; F21Y 2107/50
See application file for complete search history.

(56) References Cited

U.S. PATENT DOCUMENTS

| | | | |
|---|---|---|---|
| 9,420,768 B2 | 8/2016 | Kasner et al. | |
| 2012/0281413 A1* | 11/2012 | Lewis | A01G 9/249 362/249.11 |

(Continued)

FOREIGN PATENT DOCUMENTS

| | | |
|---|---|---|
| CN | 104768370 A | 7/2015 |
| CN | 206776211 U | 12/2017 |

(Continued)

*Primary Examiner* — Kristen C Hayes
(74) *Attorney, Agent, or Firm* — Renner, Otto, Boisselle & Sklar, LLP

(57) ABSTRACT

A lighting system for a vertical garden includes at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources, a power supply, and at least one power connector connected between the drive circuit and the power supply.

21 Claims, 8 Drawing Sheets

(51) Int. Cl.
  *F21Y 105/18*    (2016.01)
  *F21Y 107/50*    (2016.01)

(56) References Cited

U.S. PATENT DOCUMENTS

2017/0290274 A1* 10/2017 Sulejmani ............. F21V 21/088
2020/0390039 A1* 12/2020 Sulejmani ................ A01H 6/28
2021/0127608 A1*  5/2021 Hardgrove ............. A01G 7/045
2023/0060567 A1*  3/2023 Xie ....................... F21V 23/023

FOREIGN PATENT DOCUMENTS

| CN | 206948986 U     |   | 2/2018 |           |
|----|-----------------|---|--------|-----------|
| CN | 108741996 A     |   | 11/2018 |          |
| KR | 102096168 B1    |   | 4/2020 |           |
| WO | WO-2017041709 A1 | * | 3/2017 | ............... F21K 9/20 |

* cited by examiner

LIGHTING SYSTEM FOR VERTICAL GARDEN

FIELD OF INVENTION

The present invention relates to a modular lighting system for a vertical garden.

BACKGROUND

Grow lights are used for gardening, such as in indoor gardening or outdoor gardening systems. For example, grow lights may be used in hydroponic gardening systems. Conventional grow light arrangements may be suitable and easily integrated in small and horizontal planters. However, conventional grow light arrangements may be deficient for use with larger planters and vertical planters. As a plant grows and accommodates more space, it may be difficult to modify the existing grow light arrangement to ensure that the light is aimed directly at the desired portions of the plant. Moreover, the structure of the lighting arrangement may interfere with the plant. In a vertical garden, positioning the grow lights to ensure that the lower and upper portions of the plant are evenly covered by the grow lights may also present challenges.

SUMMARY OF INVENTION

The present application provides a modular lighting system that is configured to be implemented in a vertical garden. The modular lighting system includes one or more light rings positioned along a vertical axis and having a circular form factor with light sources arranged in a conical shape, such that light is aimed directly at the plants in the vertical garden. In a general embodiment, a lighting system for a vertical garden includes at least one light ring having a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources, a power supply, and at least one power connector connected between the drive circuit and the power supply, the at least one power connector attached to the central hub member and extending radially inwardly from the central hub member.

Advantageously, the connectors and/or wiring for the lighting system are arranged internally within the vertical garden and relative to the arrangement of plants, by extending inside internal through-cavities of the planter modules of the vertical garden and inside the ring structure of the light ring. Thus, both undesirable access to the electronics and interference with the plants is prevented. The connectors and/or wiring may also be sealed and shrouded with a food-safe material.

The planter modules are vertically stackable along the common vertical axis and able to be assembled with or without a light ring between two of the planter modules. One or more light rings are spaced along the vertical common axis to enable access to the plants supported in the planter modules. Each light ring includes interlocking elements that are configured to interlock with two planter modules, which are also configured to interlock with each other without a light ring therebetween. The configuration of the light ring is advantageous in that the plants are able to extend and grow through the recesses defined between spokes of the light ring. The outer ring member may also act as a support structure to support the plant.

The power output for the light rings may also be adjusted such that a light ring position higher relative to other light rings may be configured to have a higher output as compared with lower light rings to provide an additive effect over the height of the vertical garden. The light sources may be light-emitting diodes and are configured to define adjustable light emission cones. The light emission cones are configured to overlap to increase the light intensity and the mixing of colors.

According to an aspect of the invention, a vertical garden may include a modular lighting system.

According to an aspect of the invention, a lighting system for a vertical garden may include a plurality of circular form factor light rings.

According to an aspect of the invention, a lighting system for a vertical garden may include a plurality of light rings arranged along a common vertical axis.

According to an aspect of the invention, the drive circuit for the plurality of light sources may be arranged in one of the plurality of spoke members.

According to an aspect of the invention, a vertical garden may include a plurality of planter modules that are configured to be interlocked together with or without a light ring therebetween.

According to an aspect of the invention, a lighting system for a vertical garden may include at least one light ring having a central hub member configured to be removably mounted to the vertical garden, an outer ring member, and a plurality of spoke members extending radially between the central hub member and the outer ring member, a plurality of light sources supported in the outer ring member, and a drive circuit, a power supply, and at least one power connector connected between the drive circuit and the power supply.

According to another aspect of the invention, a vertical garden may include a plurality of planter modules that are stackable along a common vertical axis and define interior through-cavities, a plurality of light rings that each include a central hub member configured to be removably mounted between two of the plurality of planter modules, an outer ring member, and a plurality of spoke members extending radially between the central hub member and the outer ring member, a plurality of light sources supported in the outer ring member, and a drive circuit for the plurality of light sources arranged in one of the plurality of spoke members, wherein the plurality of light rings are spaced along the common vertical axis, a power supply, and at least one power connector connected between the drive circuit and the power supply, the at least one power connector attached to the central hub member and extending radially inwardly from the central hub member to extend through the interior through-cavities of the plurality of planter modules.

According to still another aspect of the invention, a method for lighting a vertical garden may include removably mounting at least one light ring to one of a plurality of planter modules that are stackable along a common vertical axis and define interior through-cavities, the at least one light ring including a central hub member configured to be interlocked between two of the plurality of planter modules, an outer ring member, and a plurality of spoke members extending radially between the central hub member and the outer ring member, a plurality of light sources supported in the outer ring member, and a drive circuit for the plurality of light sources arranged in one of the plurality of spoke members. The method may further include connecting at least one power connector between the drive circuit and a power supply.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Aspects of the present application pertain to a grow lighting system for a garden. Indoor or outdoor applications may be suitable for the garden and the garden may be used for plants, flowers, vegetables, fruits, herbs, etc. The garden may be a self-watering, self-fertilizing hydroponic garden. The lighting system may be particularly suitable for a vertical garden having stackable planter modules but the lighting system may also be used for gardens having other configurations. Other applications requiring a modular lighting system may also be suitable.

Figure 1:
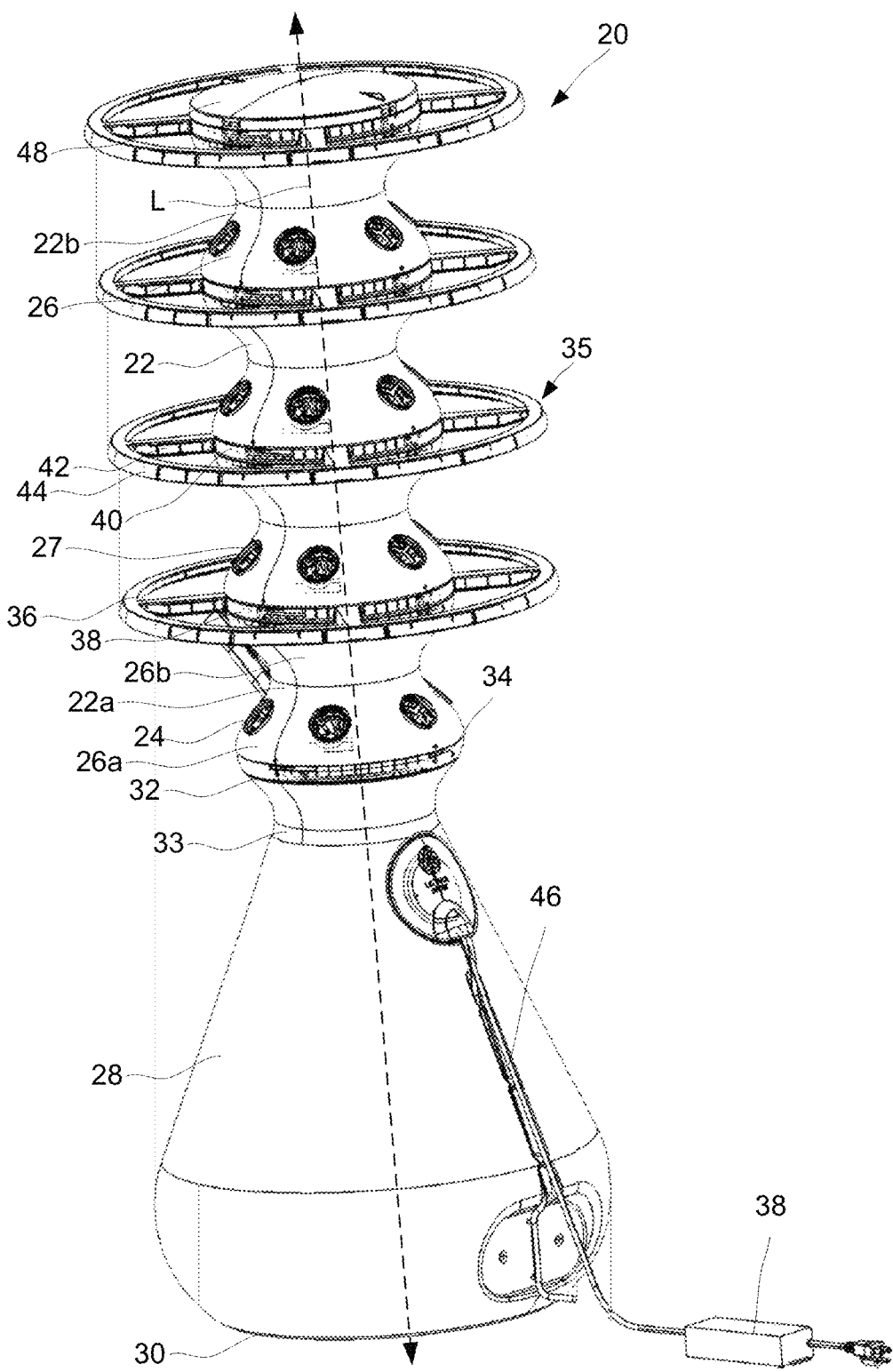
FIG. 1 shows a vertical garden including a plurality of planter modules and a modular lighting system.
Figure 2:
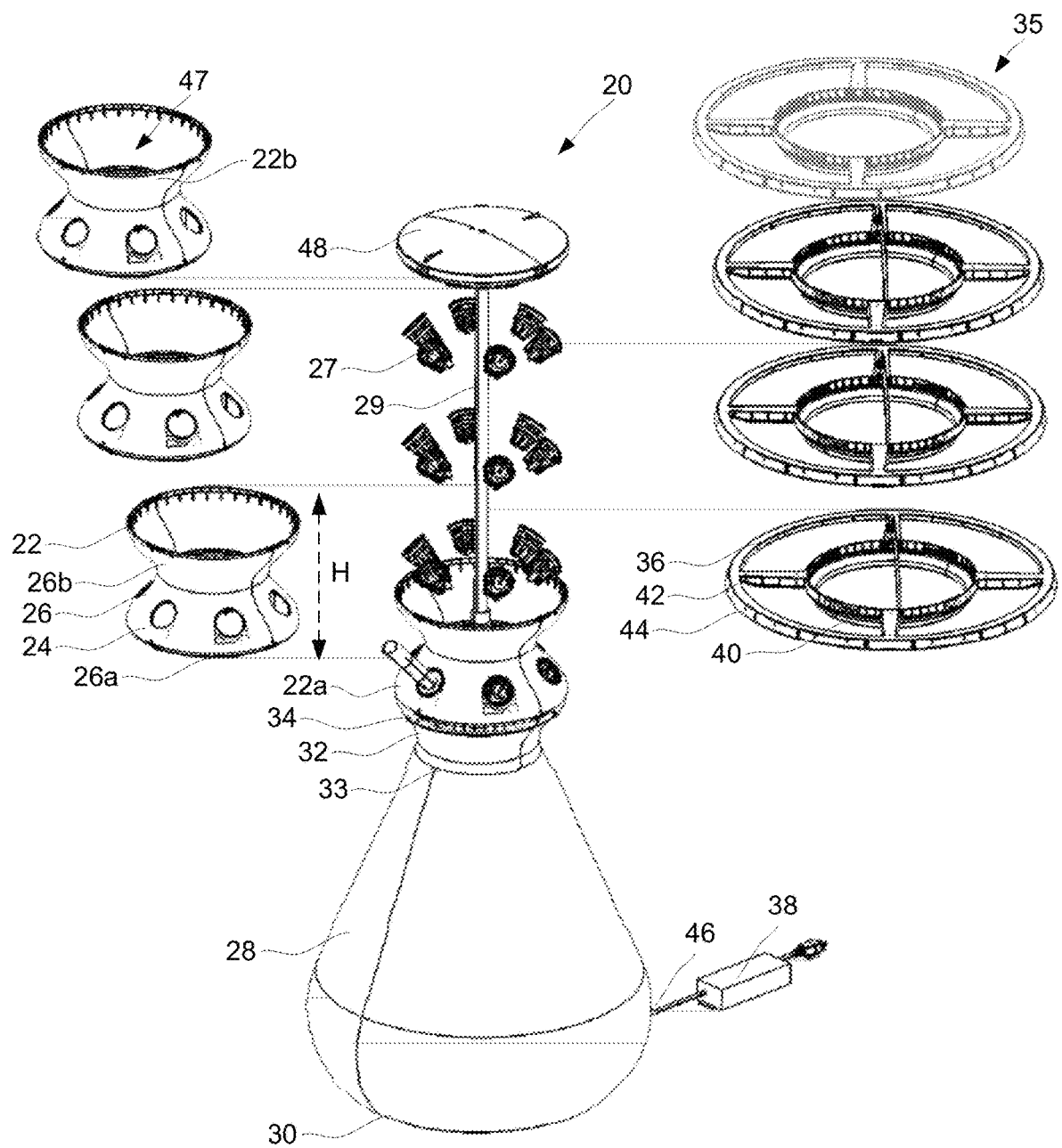
FIG. 2 shows a partially exploded view of the vertical garden of FIG. 1.

Referring first to FIGS. 1 and 2, a vertical garden 20 is shown. The vertical garden 20 includes a plurality of planter modules 22 that are stackable in a vertical direction along a common vertical axis L, as shown in FIG. 1. Each of the planter modules 22 may be identical in shape and size such that the planter modules 22 may be easily added or removed to decrease or increase the profile of the vertical garden 20. Each planter module 22 includes a plurality of recesses 24 formed in an outer surface 26 of the planter module 22. The recesses 24 are configured to receive and support a container 27 including a seedling to be grown, such as a plant, vegetable, flower, fruit, herb, etc. The recesses 24 may be circular in shape to accommodate pod-like containers 27 that are insertable and removable from the recesses 24. In other exemplary embodiments, the recesses and containers may have different complementary shapes, such as rectangular or any other suitable shape.

The outer surfaces 26 of the planter modules 22 are angled relative to the common vertical axis L, such that the recesses 24 and thus the seedling containers 27 are positioned at an angle relative to the common vertical axis L. The planter modules 22 are formed such that an outer diameter of the planter modules 22 varies along a height H of the planter modules 22, as shown in FIG. 2. In an exemplary embodiment, the recesses 24 may be formed on a lower body portion 26a of the planter module 22 having an outer surface that tapers radially outwardly in a downward direction. An upper body portion 26b of the planter module 22 tapers radially outwardly in an upward direction, such that a middle vertical section of the planter module 22 may have the smallest diameter of the planter module 22. Thus, the recesses 24 and the containers 27 are angled upwardly. The recesses 24 may be evenly spaced along the lower body portion 26a and the recesses 24 may have an ordered arrangement. Other dimensions and shapes for the planter modules 22 may be suitable.

The planter modules 22 are supported by a base 28 that is configured to rest on a horizontal surface and encloses a water pump for the vertical garden 20. The water pump is configured to supply water to a fluid pipe conduit 29 that extends through the middle of the planter modules 22, as shown in FIG. 2. The base 28 may have a tapered configuration that tapers radially inwardly in an upward direction, such that a bottom surface 30 of the base 28 has a larger surface area as compared with a top portion 32 of the base 28. In exemplary embodiments, the base 28 may include a bottleneck portion 33 proximate the top portion 32 of the base 28. The base 28 may have a height and outermost diameter that are greater than a height and outermost diameter of the planter modules 22. Similar to the planter modules 22, the outer diameter of the base 28 may change along the height of the planter module 22. Many other dimensions and shapes may be suitable for the base 28.

As shown in FIG. 1, a lowermost planter module 22a is removably attached to the top portion 32 of the base 28. For example, the lowermost planter module 22a and the top portion 32 of the base 28 may have an interlocking engagement 34 with complementary engaging parts, e.g. threaded connectors, tongue and groove connectors, meshing teeth, press-fit connection, snap-fit connection, etc. The planter modules 22 are also configured to have a similar interlocking engagement with each other. Any number of planter modules 22 may be provided. Between one and six planter modules 22 may be provided. As shown in FIGS. 1 and 2, four planter modules 22 may be provided. More than six planter modules 22 may be provided in other exemplary embodiments.

The vertical garden 20 includes a modular lighting system 35 for providing lighting to grow the seedlings in the containers 27. The modular lighting system 35 is configured to aim and direct the light at the recesses 24 of the planter modules 22 and thus the containers 27 supported in the recesses 24. At least one light ring 36 and a power supply 38 constitute the modular lighting system 35. One or more light rings 36 having a circular form-factor may be provided. Each light ring 36 includes a plurality of light sources, such as light-emitting diodes (LEDs), and is connected to the power supply 38. Alternatively, the power supply may be incorporated into the light ring 36. The light rings 36 are removably mounted to the planter modules 22 such that the light ring 36 may be easily added or removed from the vertical garden 20.

The number of light rings 36 may correspond to the number of planter modules 22, or fewer light rings 36 than the number of planter modules 22 may be provided. Each light ring 36 may be interlocked between two planter modules 22, which may be interlocked to each other with or without a light ring. A central hub member 40 of the light ring 36 is attached to the planter modules 22 and a plurality of spoke members 42 extend radially outwardly from the central hub member 40 to an outer ring member 44 that includes a plurality of light sources. The outer ring member 44 and the central hub member 40 are concentrically arranged in a same plane such that the outer ring member 44 radially surrounds the central hub member 40.

In an exemplary embodiment, the light ring 36 is configured to support the LEDs to aim light downwardly from the outer ring member 44 toward the angled recesses 24 of the corresponding planter module 22. The outer ring member 44 is radially spaced from the central hub member 40 such that plants may extend and grow through spaces defined between the spoke members 42 of the light ring 36. Advantageously, the light ring 36 is configured to provide grow lighting while also enabling access to the plants. The outer ring member 44 may also be configured to provide structural support for the plant.

The light rings 36 are evenly spaced along the common vertical axis L such that one planter module 22 extends vertically between two light rings 36. Each of the light rings 36 may be identical in shape and size. In other exemplary embodiments, some of the light rings 36 may be sized to have larger or smaller diameters depending on the arrangement of the planter modules 22. Power connectors 46, such as wires, cables, or harnesses, are connected to the power supply 38 and extend through the base 28 and through interior through-cavities 47 defined by the planter modules 22 for connection with the light rings 36, as shown in FIG. 2. The through-cavity 47 is open to outside the planter module 22 in both axial directions. Accordingly, all of the light rings 36 are connected and powered by the power supply 38. The top of the vertical garden 20 may have a cap 48 that encloses the through-cavity 47 of the uppermost planter module 22b.

Although the light rings 36 are shown as being arranged to aim light downwardly at the recesses 24, in another exemplary embodiment, the planter modules 22 and the light rings 36 may be configured such that the light ring 36 is attached to a bottom of the planter module 22 to direct light upwardly toward the recess 24. For example, the diameters of the light rings 36 may be selected and the outer ring member 44 may be positioned to direct light upwardly at plants that are arranged at a nearly vertical angle relative to the common vertical axis L. Thus, a different orientation of the light rings 36 and the planter modules 22 is possible.

Figure 3:
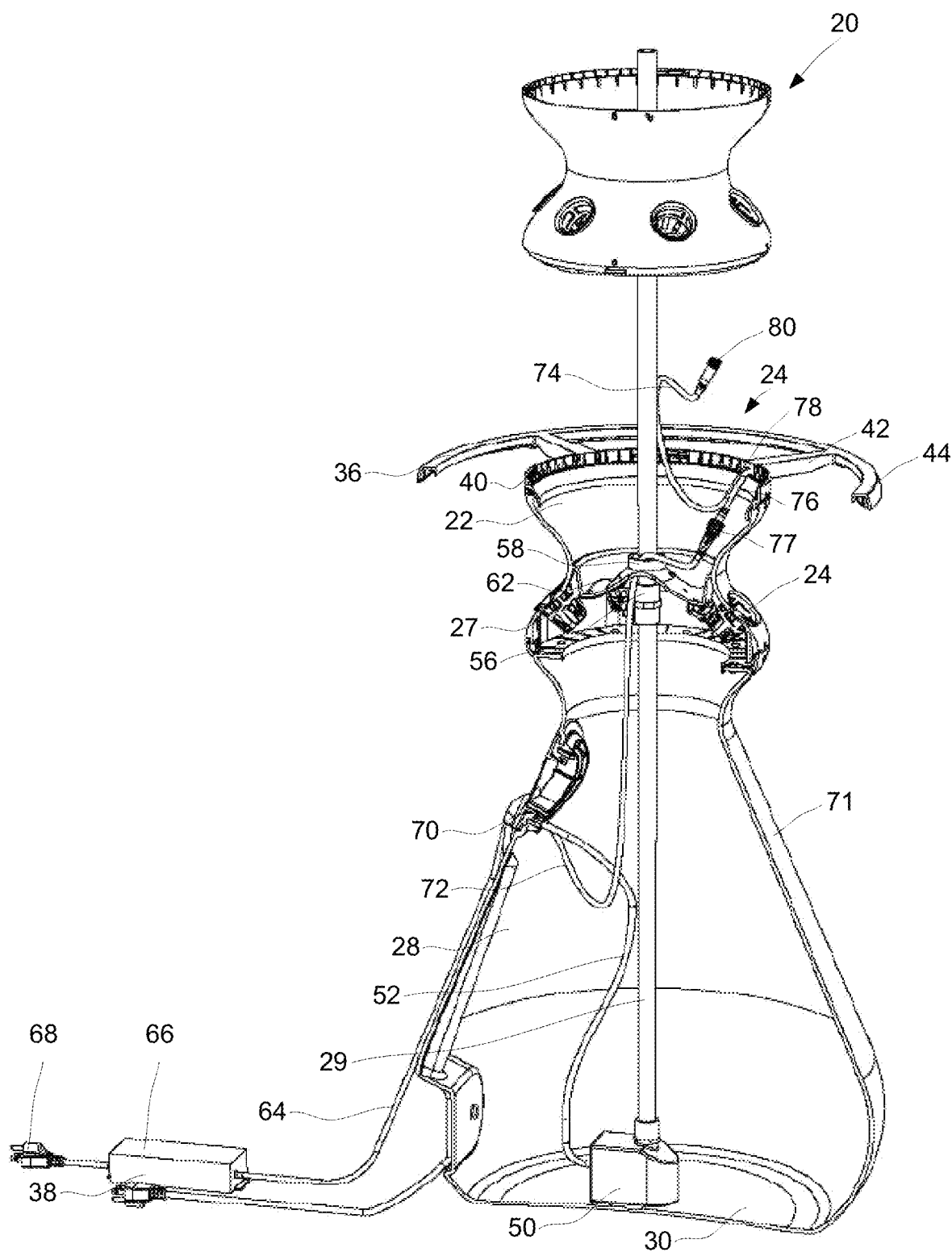
FIG. 3 shows a sectional view of the vertical garden of FIG. 1.
Figure 4:
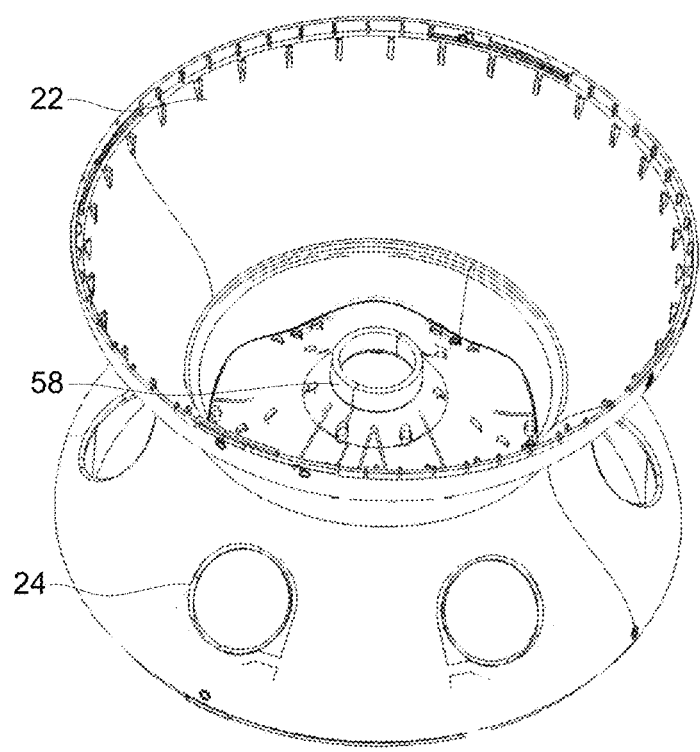
FIG. 4 shows a top view of a planter module of FIG. 1.
Figure 5:
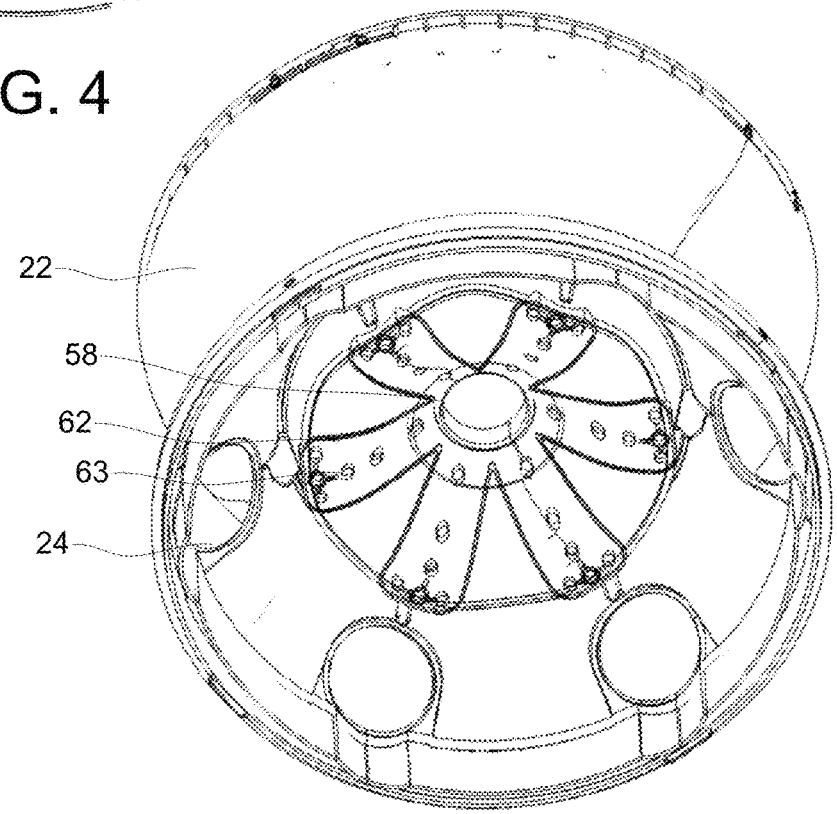
FIG. 5 shows a bottom view of a planter module of FIG. 1.

Referring now to FIGS. 3-5, further details of the vertical garden 20 are shown. FIG. 3 shows a sectional view of the vertical garden 20, FIG. 4 shows a top view of a planter module 22, and FIG. 5 shows a bottom view of the planter module 22. A water pump 50 rests on the bottom surface 30 of the base 28 and is connected to a power source via an internal connector 52. The tubular pipe or conduit 29 is connected to the water pump 50 and extends upwardly from the water pump 50 along the common vertical axis L (shown in FIG. 1). A pipe coupler 56 is used to co-axially couple axially adjacent portions of the tubular conduit 29, such that tubular conduits 29 can be added or removed based on the number of planter modules 22.

As best shown in FIG. 4, an internal hub 58 of the planter module 22 is configured to receive the tubular conduit 29. The internal hub 58 is configured to radially surround a corresponding tubular conduit 29 such that the tubular conduit 29 is inserted through the internal hub 58 during assembly. The tubular conduit 29 may also be supported for vertical alignment by the internal hub 58, as best shown in FIG. 3. A plurality of fluid supply structures 62 extend radially outwardly from the internal hub 58 toward the recesses 24, as best shown in FIG. 5. The fluid supply structures 62 may be formed as fingers extending from the internal hub 58 and each fluid supply structure may include a plurality of fluid passages 63. The tubular conduit 29 and the fluid supply structures 62 are configured to supply water to the seedling containers 27 supported in the recesses 24.

The lighting system 35 includes an external power connector 64 that is connected to the power supply 38. The power supply 38 may include a battery 66 that is charged via a plug 68 being connected to a power source, and may be either internal or external to the light ring 36 The external power connector 64 extends outside the base 28 and is connected to a base port 70 formed in a sidewall 71 of the base 28. An internal power connector 72 is also connected to the base port 70 inside the sidewall 71. Accordingly, the external power connector 64 and the internal power connector 72 are connected and communicatively coupled at the base port 70. The internal power connector 72 extends through the hollow interior of the base 28 and upwardly toward the internal hub 58 of the planter module 22. The internal hub 58 may be configured to have a diameter that is larger than the outer diameter of the tubular conduit 29 to enable the internal power connector 72 to extend between the internal hub 58 and the tubular conduit 29.

The light ring 36 includes a cable assembly having an upper or output power connector 74 and a lower or input power connector 76. The input power connector 76 includes a coupler 77 such as a threaded coupler that is configured to couple the input power connector 76 and the internal power connector 72. Any suitable cable or wire connector may be suitable. The output power connector 74 includes a coupler 80 configured for connection with an input power connector of an upper light ring. Accordingly, the light rings 36 may be daisy-chained, or connected in series to the power supply 38 via input and output power connectors of each light ring 36. Using the separable power connectors is advantageous in that the light rings 36 can be easily connected and disconnected to add and remove light rings 36 to the vertical garden 20.

Each of the output power connector 74 and the input power connector 76 are connected to a bracket 78 that is supported by the central hub member 40. The central hub member 40 is configured to be releasably mounted to the planter module 22. The bracket 78 is arranged at an intersection between one of the plurality of spoke members 42 and the central hub member 40, such that the bracket 78 is coupled with circuitry arranged in the corresponding spoke member 42. Accordingly, the bracket 78 connects the power connectors 74, 76 with the light sources arranged in the outer ring member 44 that are connected to the circuitry in the spoke member 42. The configuration of the light sources and the power connectors is advantageous in that the power connectors and light sources are arranged inside the planter modules 22 and the light rings 36 to prevent undesirable access to the electronics and interference of the electronics with the plants.

Figure 6:
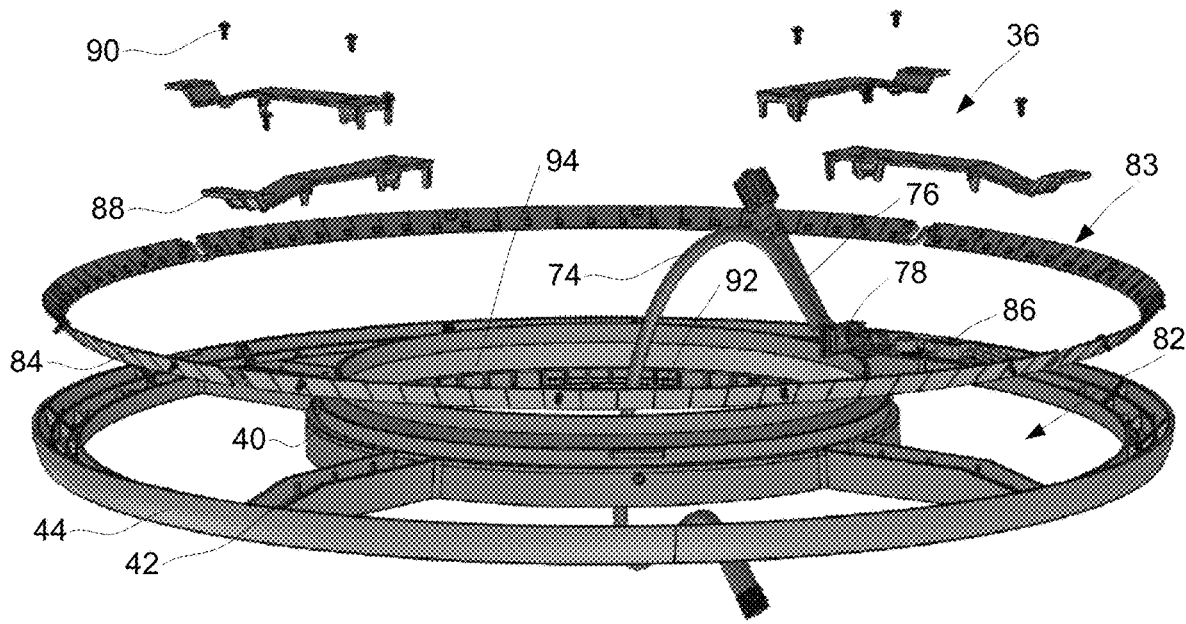
FIG. 6 shows an exploded view of a light ring of the modular lighting system of FIG. 1.
Figure 7:
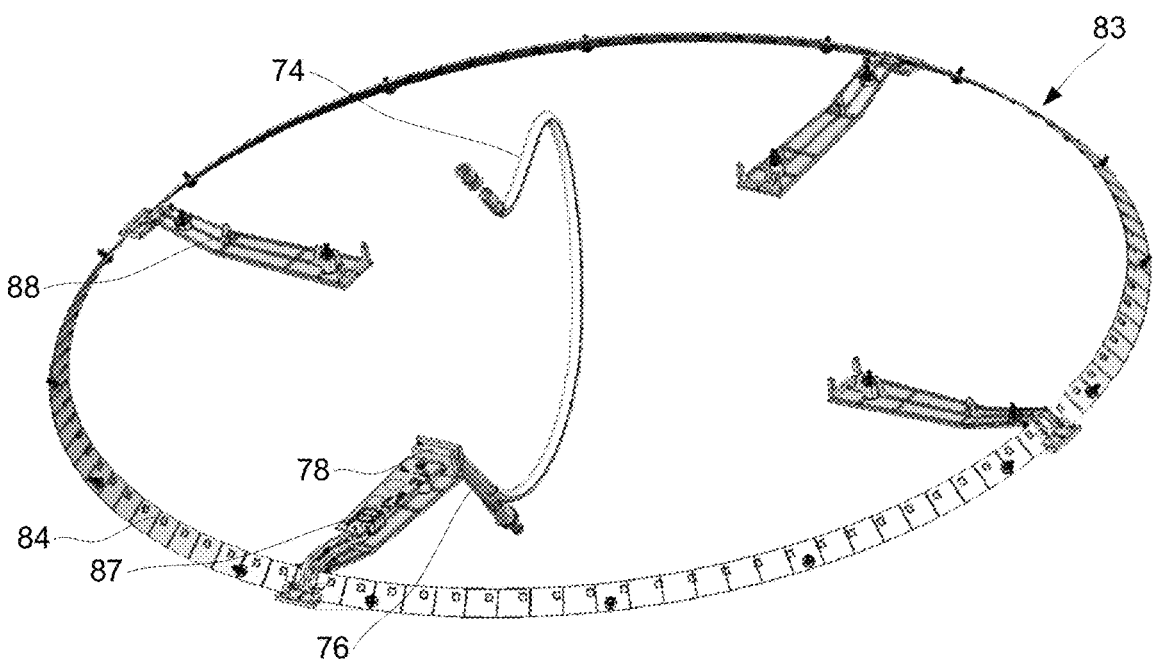
FIG. 7 shows electronics of the light ring of FIG. 6.
Figure 8:
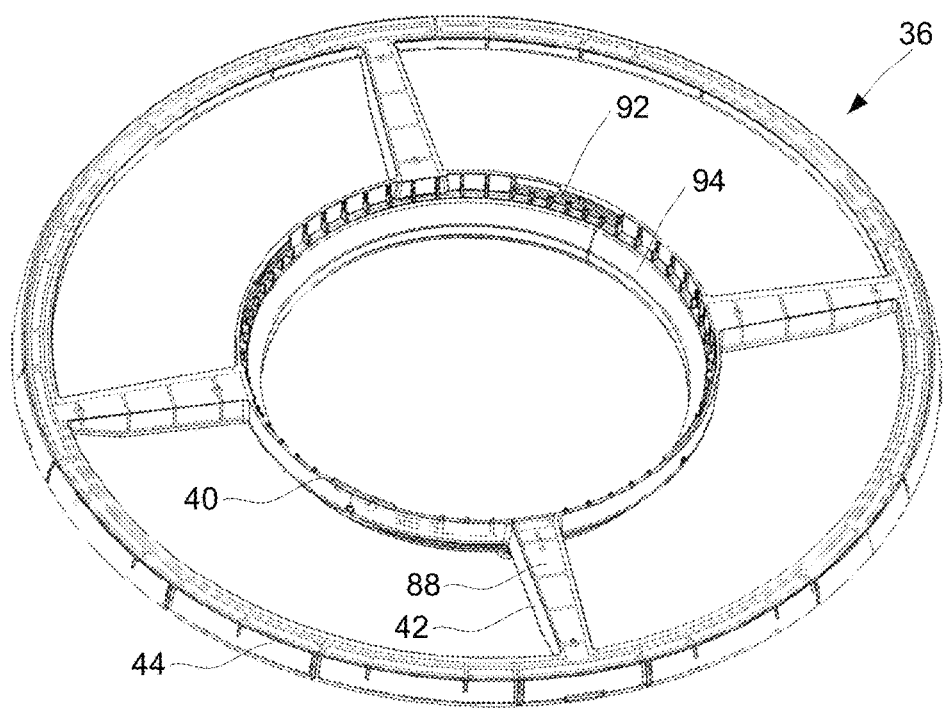
FIG. 8 shows a bottom view of the light right ring of FIG. 6 when assembled.

Referring now to FIGS. 6-8, further details of the light ring 36 are shown. FIG. 6 shows a bottom exploded view of the light ring 36, FIG. 7 shows the electronics of the light ring 36, and FIG. 8 shows the light ring 36 assembled without the power connectors. In an exemplary embodiment, the central hub member 40, the spoke members 42, and the outer ring member 44 may be integrally formed as one piece. The central hub member 40, the spoke members 42, and the outer ring member 44 may be molded of a plastic material. Any number of spoke members 42 may be provided, such as between one and seven. Four spoke members 42 may be provided in exemplary embodiments. Providing fewer spoke members 42 is advantageous in enabling larger arcuate recesses 82 between the spoke members 42 through which the plants are able to extend.

The outer ring member 44 is formed to accommodate and position a plurality of light sources 83, such as LEDs. The light sources 83 include light printed circuit boards (PCBs) 84 which may be aluminum substrate PCBs 84. The light PCBs 84 may be arcuate in shape and are positioned at an angle relative to the common vertical axis L (shown in FIG. 1). Any number of light PCBs may be provided. For example, two or more light PCBs 84 may be provided. Four light PCBs 84 may be provided in exemplary embodiments. Each of the light PCBs 84 may be identical in shape and size and the light PCBs 84 may be arranged to cover an entire circumference of the outer ring member 44. Accordingly, the light PCBs 84 form a truncated cone surface that is angled radially outwardly in a downward direction. The angle of the cone surface may be adjusted to aim light directly at the recesses 24 (shown in FIGS. 1 and 2) and thus the plants.

The light sources 83 further include at least one drive PCB 86 for the light PCBs 84. As best shown in FIG. 6, the drive PCB 86 may be arranged in the outer ring member 44 and is connected to the bracket 78 for the output power connector 74 and the input power connector 76. The drive PCB 86 is configured to drive all of the light PCBs 84 which are coupled together. The drive PCB 86 may be connected to and/or part of a drive circuit 87. Advantageously, at least part of the drive circuit 87 for the light sources 83 may be housed in one of the spoke members 42 such that the electronics for the light sources 83 of the light ring 36 are contained in the light ring 36 itself.

Each of the spoke members 42 includes a spoke cover 88 that is secured to the spoke member 42 via bolts 90. The spoke covers 88 may be formed of plastic and are configured to enclose the spoke member 42, such that the drive circuit 87 for the light sources extending through one of the spoke members 42 is protected from water by the spoke cover 88. The spoke members 42 and the spoke covers 88 may be formed of the same molded plastic material, or any other suitable material.

As shown in FIGS. 6 and 8, the central hub member 40 includes interlocking elements 92 that are configured to engage with corresponding interlocking elements of the planter modules 22. The interlocking elements 92 may include complementary engaging parts, e.g. threaded connectors, tongue and groove connectors, meshing teeth, press-fit connection, snap-fit connection, etc. The interlocking elements 92 may be formed on an inner circumference 94 of the central hub member 40. As shown in FIGS. 6 and 7, the input power connector 76 and the output power connector 74 extend radially inwardly relative to the outer ring member 44 and the light sources 83 such that the power connectors 74, 76 are accommodated in an interior of the light ring 36. The output power connector 74 extends through the central hub member 40 and is configured to extend along the common vertical axis L through the interior through-cavity 47 of the planter module 22 (shown in FIGS. 1 and 2).

The power connectors 74, 76 may be formed as sealed wires or cables that are shrouded by a sleeve to prevent water reaching the electronics. For example, the power connectors 74, 76 may be shrouded by silicone or another material that is suitable for protecting the cables and is also safe for use with food. The protective material is also able to be flexible to accommodate for flexibly moving the power connectors 74, 76. Other materials or sealing arrangements may be suitable for protection of the power connectors 74, 76.

Figure 9:
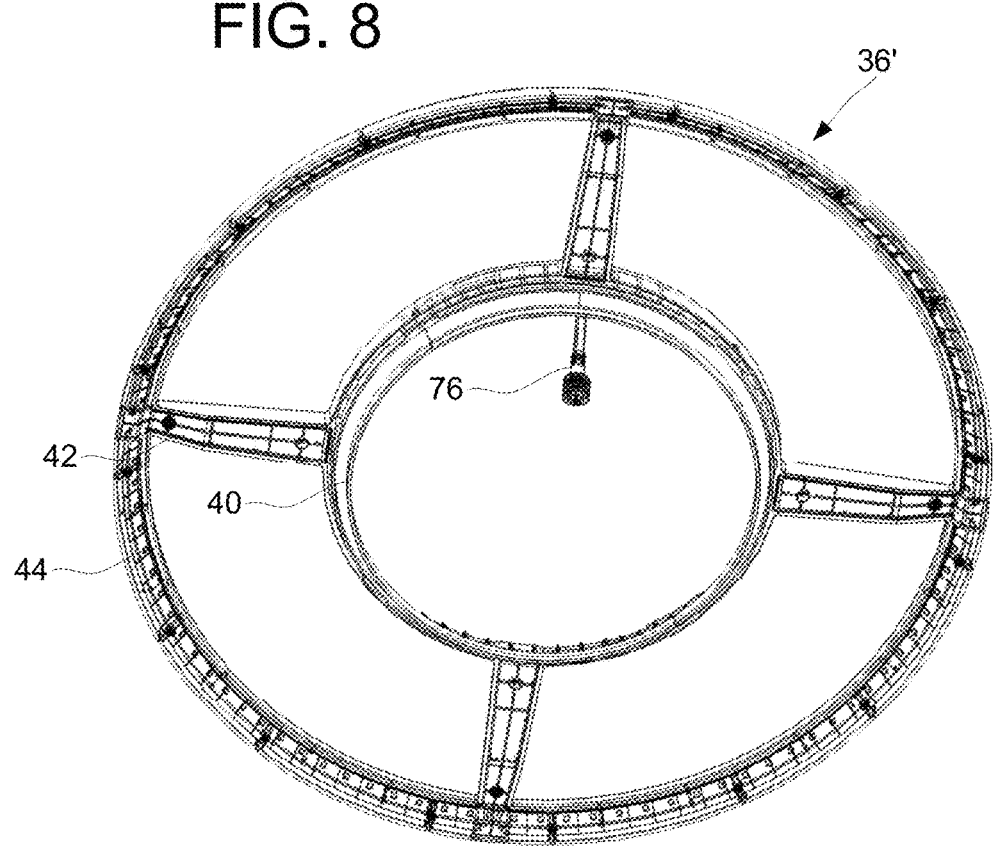
FIG. 9 shows a bottom view of an uppermost light ring of the vertical garden of FIG. 1.

FIG. 9 shows another configuration of the light ring 36' in which the light ring 36' is an uppermost light ring in the vertical garden 20 (shown in FIG. 1) that only includes an input power connector 76 attached to the central hub member 40 and extending below the light ring 36' for connection with an output power connector of a lower light ring. The uppermost light ring 36' is not configured to output power to another light ring. In an exemplary embodiment, the light ring 36' is also configured to operate at a higher power level relative to lower light rings such that the light output of the LEDs at the uppermost light ring 36' is consistent with the lower light rings for an additive effect over an entire height of the vertical garden 20 (shown in FIGS. 1 and 2). Other light rings may also be configured to provide more or less power relative to other light rings depending on the application.

Figure 10:
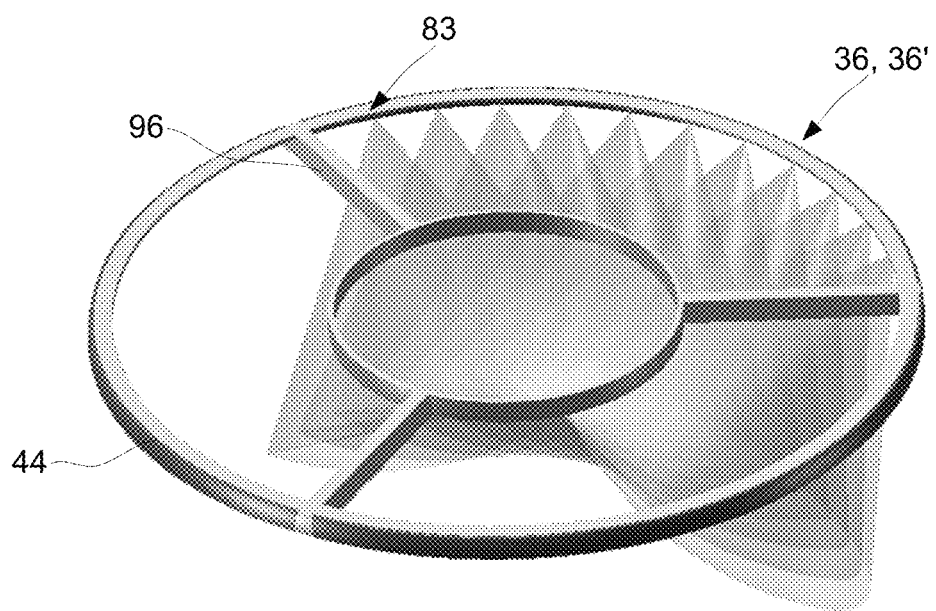
FIG. 10 shows light emission cones of the light sources of the light ring of FIG. 6.

FIG. 10 shows operation of the light ring 36, 36' in which light is emitted downwardly. Each light source 83, e.g. LED, in the outer ring member 44 is arranged to emit light having a conical emission profile 96. The light rings 36, 36' may be configured to have high intensity emission such that the conical emission profiles 96 overlap with each other to provide improved color mixing and higher intensity as compared with conventional grow lights that have a linear profile. The light sources 83 may be adjusted to provide conical emission profiles 96 with smaller or greater opening angles as desired for a particular application. For example, conical emission profiles 96 having greater opening angles may provide greater mixing and intensity.

Figure 11:
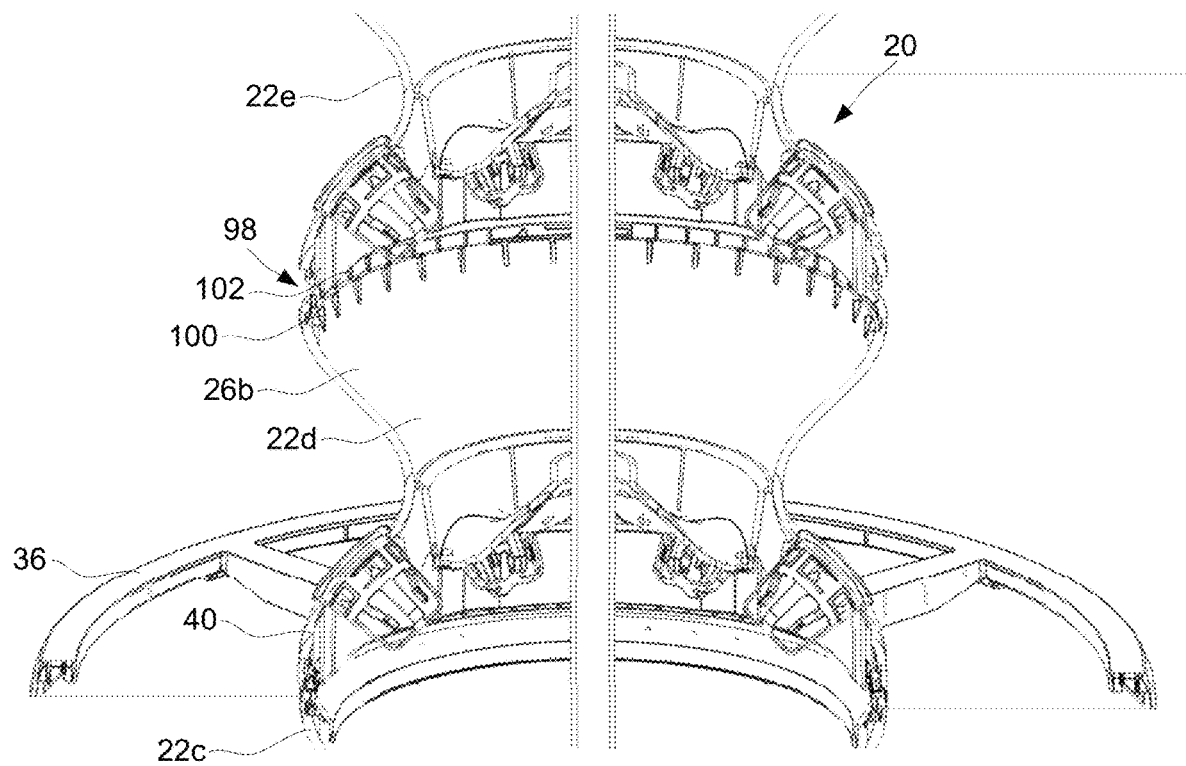
FIG. 11 shows a detailed view of the vertical garden of FIG. 1 in which planter modules are connected to each other with and without a light ring interlocked therebetween.
Figure 12:
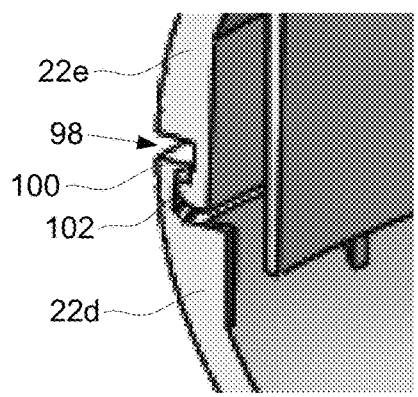
FIG. 12 shows a detailed view of an interlocking engagement between two planter modules of the vertical garden of FIG. 1 without a light ring.
Figure 13:
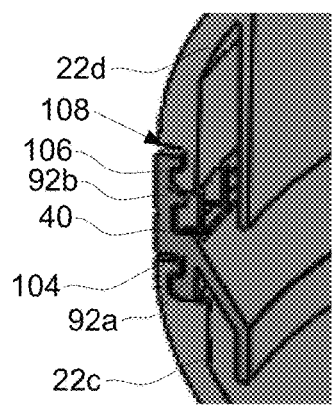
FIG. 13 shows a detailed view of an interlocking engagement between a light ring and two planter modules of the vertical garden of FIG. 1.

Referring now to FIGS. 11-13, the interlocking engagement between the light ring 36 and the planter modules 22c, 22d, 22e is shown. FIG. 11 shows the vertical garden 20 in which a light ring 36 is attached between two planter modules 22c, 22d and in which two planter modules 22d, 22e are attached without a light ring 36. FIG. 12 shows a detailed view of the interlocking engagement between two planter modules 22 without the light ring 36 and FIG. 13 shows a detailed view of the interlocking engagement between the light ring 36 and the planter modules 22.

As shown in FIGS. 11 and 12, the upper body portion 26b of the planter module 22d includes interlocking elements 100 that are engageable with corresponding interlocking elements 102 of the lower body portion of the planter module 22e. The interlocking elements 100, 102 may be formed as complementary grooves that engage each other. The complementary grooves may extend along an entire circumference of the corresponding planter module 22d, 22e. The interlocking elements 102 of the planter module 22e may extend radially outwardly while the interlocking elements 100 of the planter module 22d extend radially inwardly, or vice versa. An axially-extending gap 98 is formed between the interlocking elements 100 and the planter module 22e.

As shown in FIGS. 11 and 13, the upper body portion of the planter module 22c includes interlocking elements 104 and the lower body portion of the planter module 22d includes interlocking elements 106. Instead of the interlocking elements 104, 106 engaging with each other, the central hub member 40 of the light ring 36 is interlocked with the interlocking elements 104, 106. The central hub member 40 includes first interlocking elements 92a that are configured to interlock with the interlocking elements 104 of the of the planter module 22c, and second interlocking elements 92b that are configured to interlock with the interlocking elements 106 of the planter module 22d.

The first interlocking elements 92a and the second interlocking elements 92b may be formed as complementary grooves and the interlocking elements 92a, 92b may be formed to extend radially opposite relative to each other. The first interlocking elements 92a may be formed to have a similar shape to the interlocking elements 102 of the planter module 22e, and the second interlocking elements 92b may be formed to have a similar shape to the interlocking elements 100 of the planter module 22d. The second interlocking elements 92b may include more than one protrusion extending radially inwardly, as shown in FIG. 13. Many different configurations of the grooves and the interlocking elements may be possible.

As seen in comparing FIGS. 12 and 13, the axial gap between the planter modules 22c, 22d is increased to accommodate the light ring 36, as compared with the axial gap 98 between the planter modules 22d, 22e which do not have a light ring therebetween. An axial gap 108 that is smaller than the axial gap 98 may exist between a surface of the planter module 22d and the central hub member 40, to enable removal and insertion. Accordingly, the light ring 36 is easily integrated with the existing planter modules 22c, 22d, 22e which can be assembled with or without a light ring 36.

A method for lighting a vertical garden, such as the vertical garden 20 of FIGS. 1 and 2, includes removably mounting at least one light ring 36 between two of a plurality of planter modules 22 that are stackable along a common vertical axis L and define interior through-cavities 47 (shown in FIGS. 1 and 2). The at least one light ring 36 includes the central hub member 40 configured to be removably mounted to one of the plurality of planter modules 22, an outer ring member 44, and a plurality of spoke members 42 extending radially between the central hub member 40 and the outer ring member 44, a plurality of light sources 83 supported in the outer ring member 44, and a drive circuit for the plurality of light sources 83 arranged in one of the plurality of spoke members 42 (shown in FIG. 6). The method further includes connecting at least one power connector 72, 74, 76 between the drive circuit and a power supply 38 (shown in FIG. 2), attaching the at least one power connector 72, 74, 76 to the central hub member 40 to extend radially inwardly from the central hub member 40, and inserting the at least one power connector 72, 74, 76 through the interior through-cavities 47 of the plurality of planter modules 22. Any suitable materials and manufacturing methods may be used to form the planter modules 22 and the lighting system 35.

Advantageously, the lighting system for the vertical garden enables modularity in that light rings can be easily added or removed from the vertical garden. The entire vertical garden may be modular in that planter modules may also be added or removed. The light rings may be used with gardens having other configurations. The circular form factor of the light rings enables arrangement of the light rings without interference with the plants. The configuration of the electronics is advantageous in that the electronics are contained within the vertical garden, such that the electronics do not interfere with the plants and are protected from water or other undesirable access.

A lighting system for a vertical garden includes at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources arranged in one of the plurality of spoke members, a power supply, and at least one power connector connected between the drive circuit and the power supply.

The at least one light ring may include a plurality of light rings that are vertically spaced along a common longitudinal axis.

The at least one power connector may include a plurality of power connectors that are connected to each other with one of the plurality of power connectors being directly connected to the power supply.

The plurality of light sources may include a plurality of printed circuit boards that form a truncated cone shape.

The plurality of printed circuit boards may include light boards and drive boards.

The plurality of light sources may be configured to define a plurality of light emission cones that are configured to direct light at the vertical garden and are arranged to overlap with each other.

The at least one light ring may include an uppermost light ring and at least one lower light ring, the uppermost light ring having only an input power connector, and the at least one lower light ring having an input power connector and an output power connector.

The uppermost light ring may have a higher power output as compared with the at least one lower light ring.

The at least one lower light ring may include a plurality of lower light rings each having the input power connector and the output power connector.

The input power connector of an upper one of the lower light rings may extend downwardly for connection with the output power connector of a lower one of the lower light rings.

The plurality of lower light rings may include a lowermost light ring, wherein the input power connector of the lowermost light ring is connected to the power supply and the output power connector of the lowermost light ring is connected to an upper one of the plurality of lower light rings.

The at least one power connector may include a sealed cable.

The sealed cable may have a shrouded sleeve.

The lighting system may include a plurality of spoke covers for covering each of the plurality of spoke members.

The central hub may include a plurality of interlocking elements that are engageable with corresponding interlocking elements of the vertical garden.

The central hub member, the outer ring member, and the plurality of spoke members may be integrally molded of a plastic material.

The plurality of spoke members may include between three and five spoke members.

The at least one power connector may be attached to the central hub member and extend radially inwardly from the central hub member.

A vertical garden includes a plurality of planter modules that are stackable along a common vertical axis and define interior through-cavities, a plurality of light rings that each include a central hub member configured to be removably mounted between two of the plurality of planter modules, an outer ring member, and a plurality of spoke members extending radially between the central hub member and the outer ring member, a plurality of light sources supported in the outer ring member, and a drive circuit for the plurality of light sources arranged in one of the plurality of spoke members, wherein the plurality of light rings are spaced along the common vertical axis, a power supply, and at least one power connector connected between the drive circuit and the power supply, the at least one power connector attached to the central hub member and extending radially inwardly from the central hub member to extend through the interior through-cavities of the plurality of planter modules.

The central hub member may be interlocked to each of the two of the plurality of planter modules.

A method for lighting a vertical garden includes removably mounting at least one light ring to one of a plurality of planter modules that are stackable along a common vertical axis and define interior through-cavities, the at least one light ring including a central hub member configured to be interlocked between two of the plurality of planter modules, an outer ring member, and a plurality of spoke members extending radially between the central hub member and the outer ring member, a plurality of light sources supported in the outer ring member, and a drive circuit for the plurality of light sources arranged in one of the plurality of spoke members.

The method may include connecting at least one power connector between the drive circuit and a power supply, attaching the at least one power connector to the central hub member to extend radially inwardly from the central hub member, and inserting the at least one power connector through the interior through-cavities of the plurality of planter modules.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A lighting system for a vertical garden, the lighting system comprising:
   at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources; and
   at least one power supply for powering the drive circuit; wherein the power supply is external to the light ring.

2. The lighting system according to claim 1, wherein the at least one light ring includes a plurality of light rings that are vertically spaced along a common longitudinal axis.

3. The lighting system according to claim 2, wherein a single power supply is connected to multiple light rings.

4. The lighting system according to claim 1 further comprising a plurality of spoke covers for covering each of the plurality of spoke members.

5. The lighting system according to claim 1, wherein the central hub member is configured to be removably mounted to one or more planter modules of the vertical garden.

6. The lighting system according to claim 1, wherein the outer ring member is radially spaced from the central hub member so as define spaces between the spokes through which plants supported by the vertical garden may extend and grow.

7. A lighting system for a vertical garden, the lighting system comprising:
   at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources; and
   at least one power supply for powering the drive circuit; wherein the drive circuit for the plurality of light sources is arranged in one of the plurality of spoke members.

8. The lighting system according to claim 7, wherein the plurality of light sources includes a plurality of printed circuit boards that form a truncated cone shape.

9. The lighting system according to claim 8, wherein the plurality of printed circuit boards includes light boards and drive boards.

10. A lighting system for a vertical garden, the lighting system comprising:
    at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources; and
    at least one power supply for powering the drive circuit; wherein the plurality of light sources are configured to define a plurality of light emission cones that are configured to direct light at the vertical garden and are arranged to overlap with each other.

11. The lighting system according to claim 10, wherein the at least one power supply is incorporated into at least one of the at least one light rings.

12. A lighting system for a vertical garden, the lighting system comprising:
    at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources; and
    at least one power supply for powering the drive circuit; wherein the at least one light ring includes an uppermost light ring and at least one lower light ring, and wherein the uppermost light ring has a higher power output as compared with the at least one lower light ring.

13. The lighting system according to claim 12, wherein the at least one lower light ring includes a plurality of lower light rings.

14. A lighting system for a vertical garden, the lighting system comprising:
- at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources; and
- at least one power supply for powering the drive circuit;
- wherein the central hub includes a plurality of interlocking elements that are engageable with corresponding interlocking elements of the vertical garden.

15. A lighting system for a vertical garden, the lighting system comprising:
- at least one light ring including a central hub member configured to be removably mounted to the vertical garden, an outer ring member, and a plurality of spoke members extending radially between the central hub member and the outer ring member, a plurality of light sources supported in the outer ring member, and a drive circuit for the plurality of light sources; and
- at least one power supply for powering the drive circuit;
- wherein the central hub member, the outer ring member, and the plurality of spoke members are integrally molded of a plastic material.

16. A vertical garden comprising:
- a plurality of planter modules that are stackable along a common vertical axis and define interior through-cavities;
- a plurality of light rings that each include a central hub member configured to be removably mounted between two of the plurality of planter modules, an outer ring member, and a plurality of spoke members extending radially between the central hub member and the outer ring member, a plurality of light sources supported in the outer ring member, and a drive circuit for the plurality of light sources arranged in one of the plurality of spoke members, wherein the plurality of light rings are spaced along the common vertical axis; and
- at least one power supply for powering the drive circuits.

17. The vertical garden according to claim 16, wherein the central hub member is interlocked to each of the two of the plurality of planter modules.

18. The lighting system according to claim 16, wherein the planter module above the central hub includes a ring of plastic that nests inside a portion of the central hub, and the central hub includes a ring of plastic that nests inside a portion of the planter module below the central hub.

19. The lighting system according to claim 16, wherein a single power supply is connected to multiple light rings.

20. The lighting system according to claim 16, wherein the at least one power supply is incorporated into at least one of the at least one light rings.

21. A method for lighting a vertical garden, the method comprising:
- removably mounting at least one light ring to one of a plurality of planter modules that are stackable along a common vertical axis and define interior through-cavities, the at least one light ring including a central hub member configured to be interlocked between two of the plurality of planter modules, an outer ring member, and a plurality of spoke members extending radially between the central hub member and the outer ring member, a plurality of light sources supported in the outer ring member, and a drive circuit for the plurality of light sources arranged in one of the plurality of spoke members; and
- providing power to the drive circuit.

* * * * *